United States Patent [19]

Vail, III

[11] Patent Number: 5,065,100

[45] Date of Patent: * Nov. 12, 1991

[54] MEASUREMENT OF IN-PHASE AND OUT-OF-PHASE COMPONENTS OF LOW FREQUENCY A.C. MAGNETIC FIELDS WITHIN CASED BOREHOLES TO MEASURE GEOPHYSICAL PROPERTIES OF GEOLOGICAL FORMATIONS

[75] Inventor: William B. Vail, III, Bothell, Wash.

[73] Assignee: ParaMagnetic Logging, Inc., Woodinville, Wash.

[*] Notice: The portion of the term of this patent subsequent to May 31, 2005 has been disclaimed.

[21] Appl. No.: 474,930

[22] Filed: Feb. 5, 1990

Related U.S. Application Data

[63] Continuation-in-part of Ser. No. 200,573, May 31, 1988, Pat. No. 4,901,023, which is a continuation-in-part of Ser. No. 857,160, Apr. 29, 1986, Pat. No. 4,748,415.

[51] Int. Cl.$^5$ ............................ G01V 3/28; G01V 3/24
[52] U.S. Cl. .................................... 324/339; 324/346; 324/369
[58] Field of Search .................... 324/334, 338–344, 324/346, 359, 368, 369, 372; 166/66.5; 175/40, 45

[56] References Cited

U.S. PATENT DOCUMENTS

| | | | |
|---|---|---|---|
| 4,547,733 | 12/1985 | Thoraval | 324/338 |
| 4,720,681 | 1/1988 | Sinclair | 324/339 |
| 4,748,415 | 5/1988 | Vail, III | 324/339 |
| 4,901,023 | 2/1990 | Vail, III | 324/339 |

Primary Examiner—Walter E. Snow

[57] ABSTRACT

This invention relates to the measurement of the longitudinal components of low frequency A.C. magnetic fields from within cased boreholes which are used to measure geophysical properties of geological formations. The applied A.C. magnetic fields are generated by passing low frequency A.C. current through insulated wires or by conducting low frequency A.C. current through geological formations, either of which are examples of conducting A.C. currents through different "circuit pathways". The currents generating the applied A.C. magnetic fields are in the frequency range between 0.001 Hz and 20 Hz. The measured longitudinal components of the resulting total A.C. magnetic fields within the cased boreholes are responsive to various geophysical parameters which include the resistivities of the portions of the geological formations subject to said applied A.C. magnetic fields. Measurements of the in-phase parts and the out-of-phase parts of the longitudinal field components are defined in relation to the phases of the A.C. currents conducted through the "circuit pathways".

16 Claims, 8 Drawing Sheets

MEASUREMENT OF IN-PHASE AND OUT-OF-PHASE COMPONENTS OF LOW FREQUENCY A.C. MAGNETIC FIELDS WITHIN CASED BOREHOLES TO MEASURE GEOPHYSICAL PROPERTIES OF GEOLOGICAL FORMATIONS

This application is a continuation-in-part of application Ser. No. 07/200,573, filed on May 31, 1988, which issued as U.S. Pat. No. 4,901,023 on Feb. 13, 1990 that is entitled "Methods and Apparatus for Measurement of Low Frequency A.C. Magnetic Fields Within Cased Boreholes to Determine Properties of Geological Formations", portions of which were disclosed in U.S. Disclosure Document No. 189,963 with filing date of Apr. 4, 1988 and U.S. Disclosure Document No. 256,866 with filing date of July 2, 1990 Ser. No. 07/200,573 is a continuation-in-part application of Ser. No. 06/857,160, filed on Apr. 29, 1986, which issued as U.S. Pat. No. 4,748,415 on May 31, 1988 that is entitled "Methods and Apparatus for Induction Logging in Cased Boreholes", a portion of which was disclosed in U.S. Disclosure Document No. 127,101 filed May 2, 1984.

A search of class 324, subclass 339 provides in excess of 100 U.S. Patents concerned with induction logging of open hole formations. Typical of the methods and apparatus for open hole induction logging are disclosed in the following U.S. Pat. Nos. 4,513,376; 4,499,421; 4,455,529; 4,278,941; 3,706,025; 3,051,892; and 2,220,070. However, these disclosures do not present adequate methods and apparatus to function within borehole casing.

A search of class 324, subclass 368 provides many U.S. Patents concerned with electrical measurements in the presence of borehole casing. Typical measurements involve passing current through the casing and into the formation as disclosed in the following U.S. Pat. Nos.: 2,891,215; 2,729,784; 2,587,518; 2,459,196; and 2,414,194. However, these methods and apparatus do not provide magnetic sensing means for measurements thru casing.

Heretofore, it has been impossible to perform induction logging type measurements inside borheole casing to measure the resistivity of adjacent geological formations. One reason for this is that the response of a typical logging tool depends linearly on the conductivity of adjacent formation volumes, and varies inversely as the radius to that volume to the 6th power (*Electrical Methods in Geophysical Prospecting*, by George V. Keller and Frank C. Frischknecht, Pergamon Press, New York, Equation 58, page 82). The borehole casing is not very close to the induction coils but it is much more conductive than adjacent formations. Therefore, the signal from the casing dominates the signal from the formation. And furthermore, variations in the thickness of the casing due to oxidation effects, etc., produce systematic differences in the data which are larger than the formation signal in prior devices. Therefore, prior devices have not provided a means to nullify the relatively large signal coming from the casing to allow the measurement of the formation response.

In addition, the magnetic steel casing has a "skin depth" $\delta$ at a particular frequency given by the following equation:

$$\delta = (\rho/\pi f \mu)^{\frac{1}{2}} \qquad \text{Eq. 1}$$

(Please refer to *Fields and Waves in Communication Electronics*, by Simon Ramo, et. al., John Wiley & Sons, New York, Second Edition, 1984, Equation 11 on page 149.) Here $\rho$ is the resistivity, f is the frequency and $\mu$ is the magnetic permeability of the pipe. The magnetic fields are dampened exponentially with the skin depth. Typical steel pipes have resistivities of $10^{-7}$ ohmmeters, and relative permeabilities of 100, so that the skin depth equals the thickness of a $\frac{1}{2}$ inch thick pipe at a frequency of 1.6 Hz. The high relative permeability of steel borehole casing allows it to be called "magnetic steel borehole casing". Therefore, since the applied A.C. magnetic field in the induction system must penetrate the walls of the casing to the surrounding earth, frequencies of 20 Hz and lower must be used for such measurements. Heretofore, much higher frequencies have been used in open hole systems. Such low frequencies required in a cased hole, however, require a very sensitive induction coil magnetometer which is responsive to low frequency A.C. magnetic fields inside magnetic steel borehole casing. Therefore, an improved down hole induction coil magnetometer is required for formation resistivity measurements.

The through-casing induction coil magnetometers must be very sensitive to weak A.C. magnetic fields produced by currents caused to flow in formation. However, it is known that the natural geomagnetic noise produces fluctuations in the earth's magnetic field, and in the bandwidth between 0.001 Hz to 20 Hz, the peak-to-peak variations of said geomagnetic noise exceed $1 \times 10^{-5}$ gauss peak-to-peak. Heretofore, such noise has provided a natural limit to the measurability of A.C. magnetic fields. However, A.C. magnetic fields from the induced flowing currents in the earth may be smaller than this magnitude of noise. The invention provides a differential magnetometer, or gradiometer, which allows measurements of A.C. magnetic fields much smaller than the geomagnetic noise present. And furthermore, the invention provides apparatus and methods which allow operation of said sensitive A.C. magnetic gradiometer inside conductive and magnetic steel borehole casing.

And finally, since the steel borehole casing is also magnetic having a relative permeability of approximately 100, the magnetic fields from flowing currents in the vicinity of the borehole casing become substantially distorted by the presence of the casing. Magnetic fields which are perpendicular to the casing are magnetically shielded from the interior of the casing by the cylindrically shaped magnetic casing itself. A.C. magnetic fields which are parallel to the casing, or longitudinal fields, penetrate the casing to a degree depending on the frequency, the geometry of the casing, the conductivity of the casing, and the magnetic permeability of the casing. At low enough frequencies, such as 1 Hz, appreciable longitudinal components of said A.C. magnetic fields penetrate the casing without any special provisions, a fact which has not been generally recognized in the prior art. However, all other factors being a constant, the relatively high magnetic permeability of the casing tends to concentrate the magnetic field lines inside the casing. To avoid such problems, the invention also provides magnetic sensors which are themselves comprised of relatively massive concentrations of highly magnetic materials which dominate the presence of the casing and allow the measurement of weak A.C. magnetic fields through magnetic borehole casing.

Sources of magnetic fields, or the "primary excitation fields", which are located within the interior of a cased well bore interact with the surrounding casing and rock formation in complex ways. In the description of this problem, cylindrical coordinates are naturally used. The excitation field may be resolved at any point within the formation into a longitudinal component which is parallel to the casing, a radial or perpendicular component to the casing, and an azimuthal component which is orthogonal to the other directions. In general, for radial components of the excitation field, these components do not penetrate to the exterior of the casing at D.C. or at any frequency because of the familiar magnetic shielding arguments. At D.C. and low frequencies, longitudinal components of the excitation field may penetrate the casing, provided eddy current losses in the casing are not too great at the frequency of interest. And finally, for a short length casing, azimuthal excitation fields are transparent to the casing under certain circumstances because of the nearly lossless generation of circulating surface currents which are made to flow continuously on the interior and exterior surfaces of the casing. For long lengths of casing, however, the azimuthal fields are attenuated by eddy currents.

Therefore, the primary excitation A.C. magnetic fields within the casing may produce longitudinal and azimuthal components of the A.C. magnetic fields on the exterior of the casing. These exterior A.C. magnetic fields in turn cause induced currents to flow within the formation, as is the case with standard induction logging. These secondary currents then produce secondary A.C. magnetic fields which in turn interact with the casing in a complex fashion. Here, too, the longitudinal and azimuthal components of the secondary fields penetrate the casing under certain circumstances. These secondary fields may be measured from within the interior of the casing with various magnetic sensing means which provide an indication of the nature of the formation, and in particular, the resistivity of the formation.

Accordingly, an object of the invention is to provide new induction logging methods for formation identification through borehole casing.

It is yet another object of the invention to provide new and practical induction logging apparatus for formation identification through borehole casing.

And further, it is another object of the invention to provide new magnetic methods for formation identification through borehole casing.

And still further, it is another object of the invention to provide new magnetic sensing apparatus for formation identification through borehole casing.

Figure 1:
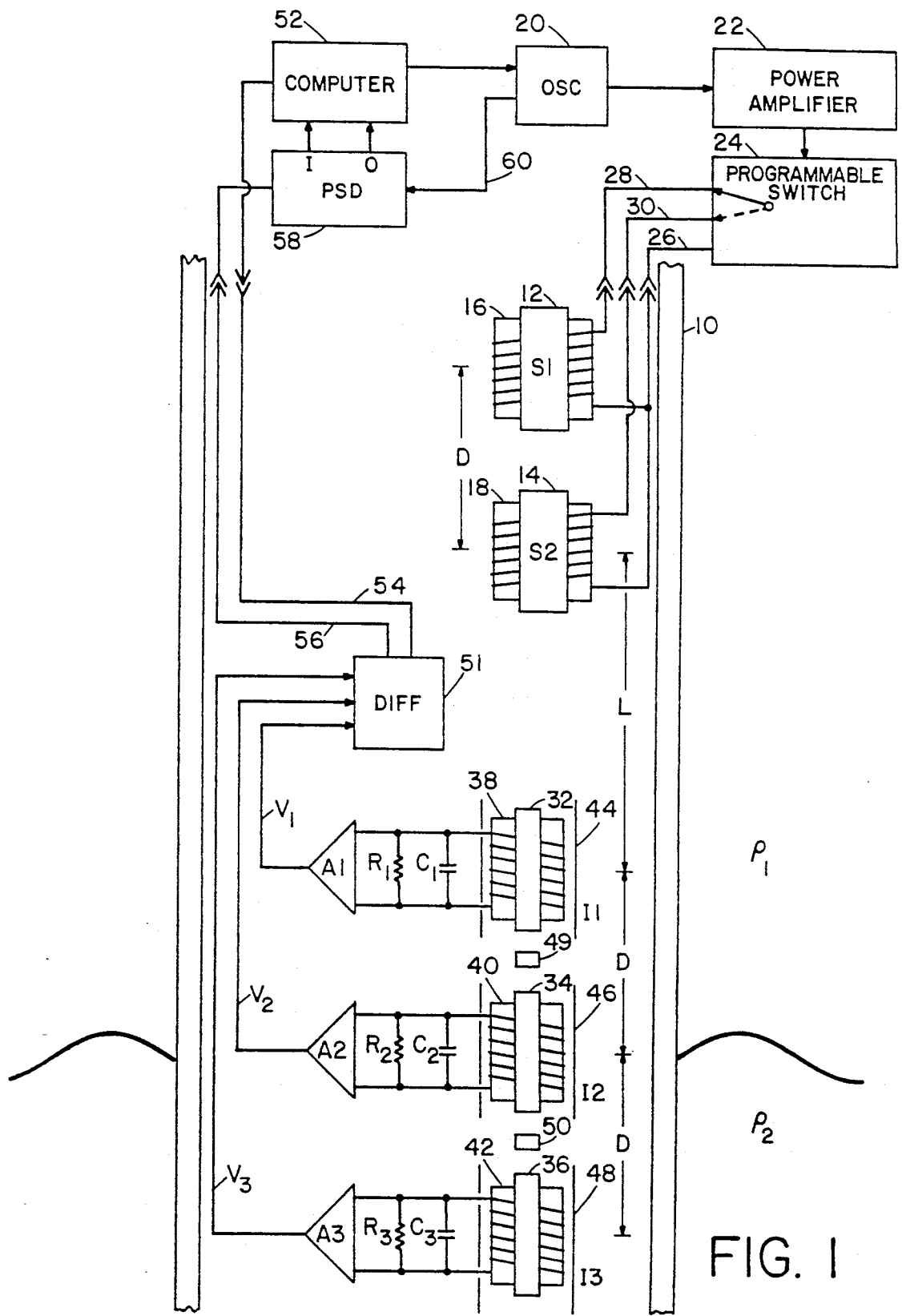
FIG. 1 is a section view of a preferred embodiment of the invention for induction logging in the presence of borehole casing.

FIG. 1 shows a preferred embodiment of the apparatus for induction logging within borehole casing 10 which surrounds the borehole itself. The formation has resistivities of $\rho_1$, and $\rho_2$. High permeability materials 12 and 14 respectively are surrounded with windings 16 and 18 respectively which provide two independent sources of the primary excitation A.C. magnetic fields, solenoids S1 and S2 respectively. The high permeability materials 12 and 14 respectively are constructed from mu-metal and a typical material is Permalloy 80 manufactured by Magnetics, Inc., located in Butler, Pa. The cores are approximately 1 inch by 1 inch square, being comprised of several stacks of long thin mu-metal strips each of which is 0.014 inch thick, ½ inch wide and 4 foot long. Approximately 200 turns of insulated #18 copper wire are used to fabricate windings 16 and 18 respectively. A programmable oscillator 20, which may be set to different frequencies and voltage amplitudes, provides the input to a power amplifier 22 which provides a high power A.C. voltage and current source to programmable switch 24 which is an electronic switch. Power amplifier 22 typically provides A.C. current at frequencies from 0.001 Hz to 20 Hz and currents of several amps peak-to-peak which is sufficient to generate A.C. magnetic fields of at least several gauss peak-to-peak in the immediate vicinity of solenoids S1 and S2. Wire 26 is connected to both common sides of the coils 12 and 14 respectively. The programmable switch initially energizes S1 when the output of the power amplifier is connected to wire 28 and the programmable switch subsequently energizes S2 when the power amplifier is connected to wire 30. Programmable switch 24 therefore alternately energizes S1 and S2 for fixed periods of time T each.

High permeability materials 32, 34, and 36 respectively are surrounded by insulated windings 38, 40, and 42 respectively which comprise three separate induction coils I1, I2, and I3. High permeability material magnetic traps 44, 46, and 48 improve the performance of the induction coils in the presence of the casing. (For additional information on such magnetic traps, please refer to the U.S. Pat. No. 4,656,422 entitled "Oil Well Logging Tools Measuring Paramagnetic Logging Effect for Use in Open Boreholes and Cased Well Bores", which issued on Apr. 7, 1987, having inventors W. B. Vail and P. B. Schwinberg, with a filing date of Apr. 8, 1985, which is Ser. No. 720,943.) Each of the induction coils are resonated at identical center frequencies with capacitors $C_1$, $C_2$, and $C_3$ respectively. In addition, the resistors $R_1$, $R_2$, and $R_3$ trim the frequency responses of the induction coils so that they are identical. Amplifiers A1, A2, and A3 amplify each voltage present providing three separate voltage outputs from the induction coil sensors, $V_1$, $V_2$, and $V_3$.

The induction coils I1, I2, I3, are typically 6 foot long to achieve the overall required sensitivity. The cores 32, 34, and 36 are approximately 6 foot long, and are 1 inch by 1 inch square, being comprised of several stacks of long thin nu-metal strips each of which is 0.014 inch thick, ½ inch wide and 6 foot long. This provides a sensor whose length is at least ten times longer than any other lateral dimension of the core. This is important because long slender cores efficiently attract magnetic field lines (*Electrical Methods in Geophysical Prospecting*, op. cit., page 237). Each lamination is electrically isolated by either a plastic spray coat or an insulating oxide layer to minimize eddy current losses. Typical of suitable materials used in these cores is Permalloy 80 type mu-metal manufactured by Magnetics, Inc. Approximately 30,000 turns of #24 gauge insulated copper wire are wound on a coil form which holds the laminations in a bundle. The mass of magnetic material in the core of the induction coil encourages magnetic flux outside the casing to concentrate in the magnetic cores of the induction coils.

The high permeability magnetic traps 44, 46, and 48 are constructed of the same individual thin mu-metal laminations as are used in the core and are disposed radially around the induction coils. The laminations are each electrically isolated from one another. These traps are approximately the same length as the induction coils and have approximately the same total combined mass as the cores.

In addition, the "magnetic weight" of a body may be defined as its weight times the relative permeability of the medium to air. The casing typically weighs 20 lbs./ft. and has a relative permeability of 100 so that its "magnetic weight" is 2,000 lbs./ft. The 1 inch by 1 inch cores have a weight of 0.31 lbs./ft. but Permalloy 80 has a relative permeability in excess of 100,000 at low frequencies thereby producing a "magnetic weight" of greater than 30,000 lbs./ft. for the core. Therefore, the sensor should have a "magnetic weight" which is equal to or greater than the "magnetic weight" of the casing for optimum response.

The magnetic traps 44, 46, and 48 improve the response of the induction coils, although they are not absolutely essential for operation. The highly magnetic cores of the induction coils will of course have fringing fields which interact the steel borehole casing. When the induction coils are resonated at a particular frequency with one of the capacitors $C_1$, $C_2$, or $C_3$, then these fringing fields interact strongly with the wall of the casing which reduces the response of the coils by causing eddy current losses in the casing. However, the traps 44, 46, and 48 respectively, tend to "trap" the fringing fields from the ends of the cores thereby keeping these fields from interacting with the casing. Those fringing fields do not cause losses in the magnetic trap since the individual magnetic laminations of the trap are electrically isolated from one another. Ideally, the weight of the trap should be comparable to the weight of the cores, although substantial variations will still work. And the lengths of the traps are ideally equal to the lengths of the cores but may be as short as one half as long to twice as long as the core lengths for reasonable operation.

In addition, calibration coil 49 is disposed equidistant from induction coil I1 and induction coil I2. Similarly, calibration coil 50 is disposed equidistant from induction coils I2 and I3. As explained in U.S. Pat. No. 4,656,422, these calibration coils are used to apply identical A.C. magnetic fields to each induction coil pair (I1 and I2 for example) when they are used in a differential manner. These calibration coils are comprised of 10 turns of insulated #18 gauge copper wire and are energized by simple circuitry which is not shown for simplicity. Such coils provide A.C. magnetic balancing means for the A.C. magnetic gradiometer.

The output voltages $V_1$, $V_2$, and $V_3$ proceed to the programmable difference electronics 51. Under command from the computer 52 over wire 54, differences in voltages from the various induction coils may be electronically provided as follows: $V_1 - V_2$ and $V_2 - V_3$. Electronics 51 also provides filtering, amplitude adjustment, and phase adjustment circuitry. The voltage output of the difference electronics 51 proceeds over wire 56 to the phase sensitive detector 58. The phase sensitive detector provides an in-phase output and an out-of-phase output with respect to the oscillator reference signal provided to the phase sensitive detector by cable 60. The respective outputs of the phase sensitive detector are provided individually to the computer 52 for digital averaging and data analysis.

The primary excitation sources S1 and S2 are separated by a distance D and the three induction coils are also individually separated by the distance D. The center line of the high permeability material 32 is separated from the centerline of the high permeability material 14 by the distance L. In addition, means not shown are provided to house the various elements in the borehole tool as accustomed in the industry, to provide a wireline enclosing wires 26, 28, 30, 54, and 56, and to provide logging truck hardware and standard instrumentation used routinely by the industry.

The first step in the operation of the induction tool is to choose the operating frequency. Because the applied fields from the solenoids S1 and S2 must penetrate the casing, frequencies lower than 20 Hz must be used to measure formation properties. The lower limit of response of the induction coils is perhaps 0.001 Hz. Typically, 1 Hz will be chosen as the operation frequency. Then calibration coil 49 is energized with a 1 Hz signal (the circuitry necessary to do this is not shown for simplicity). Then, calibration coil 49 applies an identical A.C. magnetic field to induction coils I1 and I2. Then $C_1$ is chosen for resonating the coils at 1 Hz and $R_1$ is chosen to be approximately 50K which sets the frequency response of I1. Then $C_2$ and $R_2$ are chosen to cause a null in the output signal of differential unit 51. Then, I1 and I2 respond identically even if the borehole casing adjacent to each of the coils has a different thickness or average resistivity. In this condition, the A.C. magnetic gradiometer is said to be balanced. The calibration coils 49 and 50 are each balancing means in this case. Also, since noise fluctuations in the geomagnetic field are approximately the same at induction coils I1, I2, and I3, the differential output of any pair of induction coils is substantially immune to the natural geomagnetic noise present!

When S1 is energized at the appropriate center frequency of the induction coils, it produces primarily a longitudinal magnetic field parallel to the borehole casing adjacent to S1. For low frequencies, this A.C. magnetic field penetrates the casing which subsequently causes induced eddy currents to flow in the geological formation in the vicinity of the borehole. The resulting flowing eddy currents cause an additional secondary A.C. magnetic field contribution, dB1, which is measured by measuring the voltage difference $V_1 - V_2$. Similarly, when S2 is alternatively energized, dB2 is measured by measuring $V_2 - V_3$. Differences between these two measurements $[(V_1 - V_2) - (V_2 - V_3)]$ are due entirely to differences in the resistivity of the formation over the vertical distance D, spurious casing contributions, and spurious fluid contributions in the hole. However, such differences are not due to direct coupling to the sources S1 and S2 as is required for proper operation. Such differential measurements provide a gradient in the resistivity of the formation, along with other information. In addition, there is an interesting cross-check of the data using a vertical translation of the apparatus. Suppose that the apparatus is initially in a given vertical location and that solenoid S1 is used in conjunction with measurement induction coils I1 and I2 which results in a measurement of $V_2 - V_1$. Since S1 and S2 are separated by the distance D, and I1, I2, and I3 are all separated by the distance D, then translating the apparatus vertically by the distance D should place the solenoid S2 and induction coils I2 and I3 respectively adjacent to the same formations initially measured. Therefore, measurements of $V_3 - V_2$ here should be equal to the initial measurements of $V_2 - V_1$.

Such gradient measurements on the formation may be provided at different frequencies provided computer control of $C_1$, $C_2$, and $C_3$ and $R_1$, $R_2$, and $R_3$ are provided appropriately. Both the frequency of the oscillator 20 and its amplitude affect the degree of radial penetration of the formation. The spurious influence of pipe joints may be minimized if the distance D is much larger than the thickness of typical pipe joints. Furthermore, pipe joints are periodic with the length of casing. Therefore, the data at different vertical positions may be Fourier transformed with the period of the casing length, and this component may be removed mathematically.

In addition, information may be obtained from energizing just one source, S1 for example, and measuring the output from just one induction coil, $V_1$, at several different frequencies between 0.001 Hz and 20 Hz, for example. Under appropriate circumstances, the average resistivity of the formation may be determined adjacent to the borehole using this method.

Figure 2:
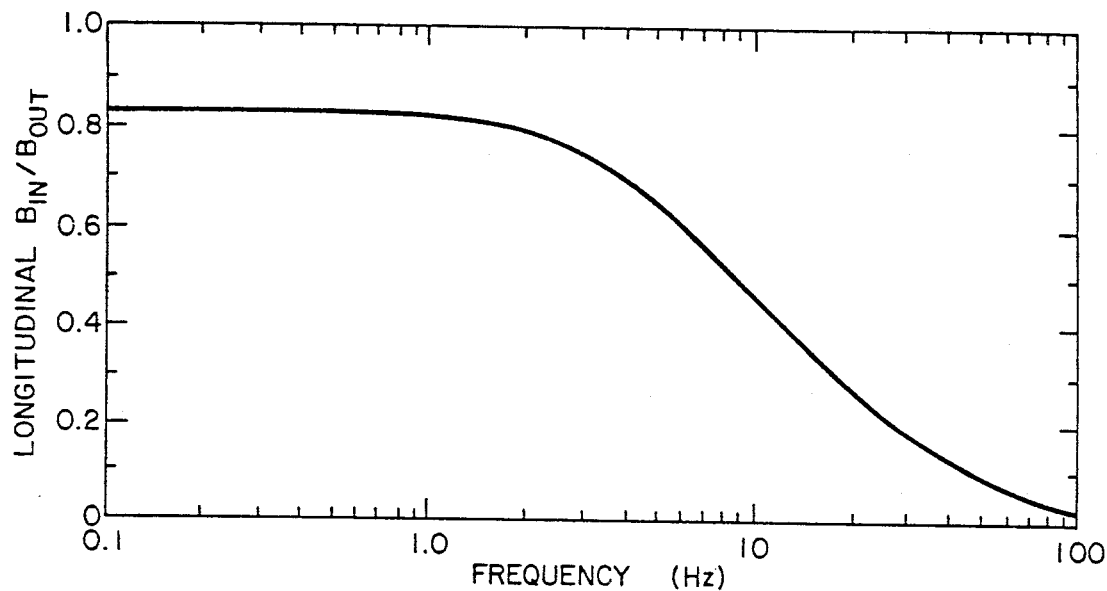
FIG. 2 is a plot of $B_{in}/B_{out}$ vs. frequency for longitudinal A.C. magnetic fields applied to the exterior of a length of borehole casing.

FIG. 2 shows the longitudinal transfer characteristics ($B_{inside}/B_{outside}$) of an A.C. magnetic field applied to the outside of a length of borehole casing and subsequently measured on the interior of the casing. In these experiments a longitudinal A.C. magnetic field was applied to an 85 inch long length of 9⅝ inch O.D. Type P110 borehole casing, with a wall thickness of 0.475 inches, which was manufactured by Nippon Steel, Inc. An air core induction coil was placed on the interior of the casing for these measurements. Clearly, below 10 Hz, these measurements prove that longitudinal A.C. magnetic fields substantially penetrate the casing. These measurements show why frequencies below 20 Hz are used for measurements of longitudinal A.C. magnetic fields through borehole casing.

Figure 3:
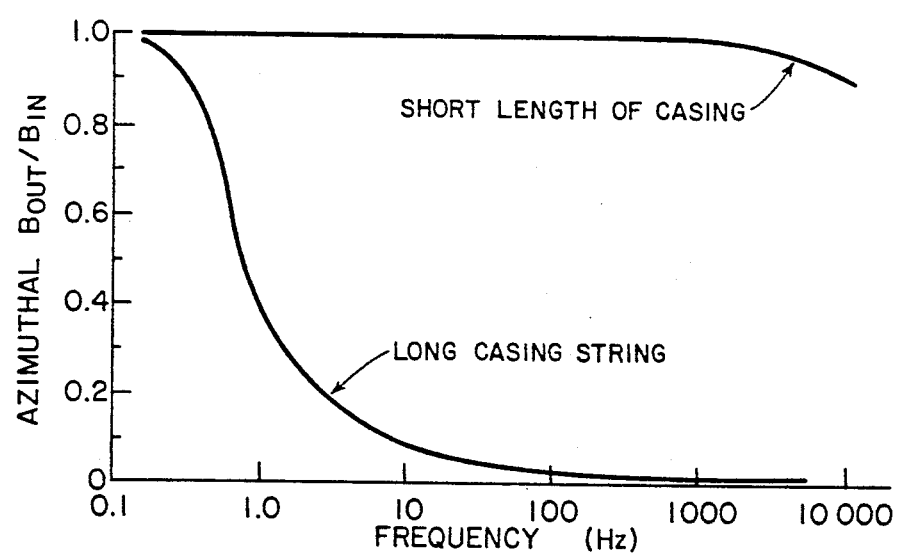
FIG. 3 is a plot of $B_{out}/B_{in}$ vs. frequency for an azimuthal field applied to the interior of several different lengths of borehole casings by a current carrying insulated wire.

FIG. 3 shows the transfer characteristic ($B_{out}/B_{in}$) of an azimuthal field applied to the interior of a length of casing and subsequently measured on the outside of the casing for a short length of casing and for a long length of casing respectively which are insulated from the earth. A short length of casing is anything shorter than 100 feet long and a long length of casing is anything longer than 1,000 feet long. Here an insulated A.C. current carrying wire is placed inside various lengths of 7 inch O.D., ⅜ inch wall thickness, Type K-55 casing manufactured by Valexy, Inc. The ratio of $B_{out}/B_{in}$ is plotted for the azimuthal component of the A.C. magnetic field at various frequencies. Although the skin depth at the higher frequencies is only a small fraction of the thickness of the wall of the casing, circulating surface currents flowing simultaneously on the inside and outside of the pipe make the pipe effectively transparent to azimuthal fields for a short length of casing. For long lengths of casing, fields are strongly attenuated at frequencies above 20 Hz.

Each magnetic gradiometer is comprised of two balanced induction coils, such as I1 and I2, and can achieve remarkable measurement accuracy inside borehole casing. Without the traps 44 and 46, for example, measurement accuracies of $1 \times 10^{-9}$ gauss peak-to-peak with integration times of several seconds can be achieved. With the traps 44 and 46 included, for example, measurement accuracies of $1 \times 10^{-10}$ gauss peak-to-peak with integration times of several seconds can be achieved. These accuracies can be obtained in the presence of the noisy earth's geomagnetic field which has noise components of $1 \times 10^{-5}$ gauss peak-to-peak between 1 Hz to 10 Hz! Depending on the strength of the sources S1 and S2, the A.C. magnetic fields due to flowing induced currents may be in the $10^{-6}$ gauss peak-to-peak range. Therefore, use of this precision A.C. magnetic gradiometer would be helpful to elucidate the resistivity of the geological formation under these circumstances.

It is possible to separate out the contributions from the primary excitation fields, the casing, and the formation resistivity by varying the frequency of the apparatus. If only the solenoid S1 is energized, and only induction coils I1 and I2 are used in a gradiometer arrangement, then the output of the gradiometer can be measured at several different frequencies, for example at 1 Hz and 20 Hz. At 1 Hz, the output of the gradiometer is a function of the primary excitation field, the casing, and the resistivity of the formation. However, at 20 Hz for example, the output is dependent only on the primary excitation field and the casing but not on the resistivity of the formation because the primary excitation A.C. magnetic fields do not substantially penetrate the casing to the formation at 20 Hz. Similar sets of measurements using the other solenoid S2 but the same induction coils I1 and I2 then allows unique separation of the primary A.C. magnetic fields and the effects of the casing because the different vertical position of S2 changes the primary A.C. fields measured by the gradiometer considerably. Therefore, the formation resistivity can be uniquely obtained as desired. The process then can be repeated with induction coils I2 and I3.

Figure 4:
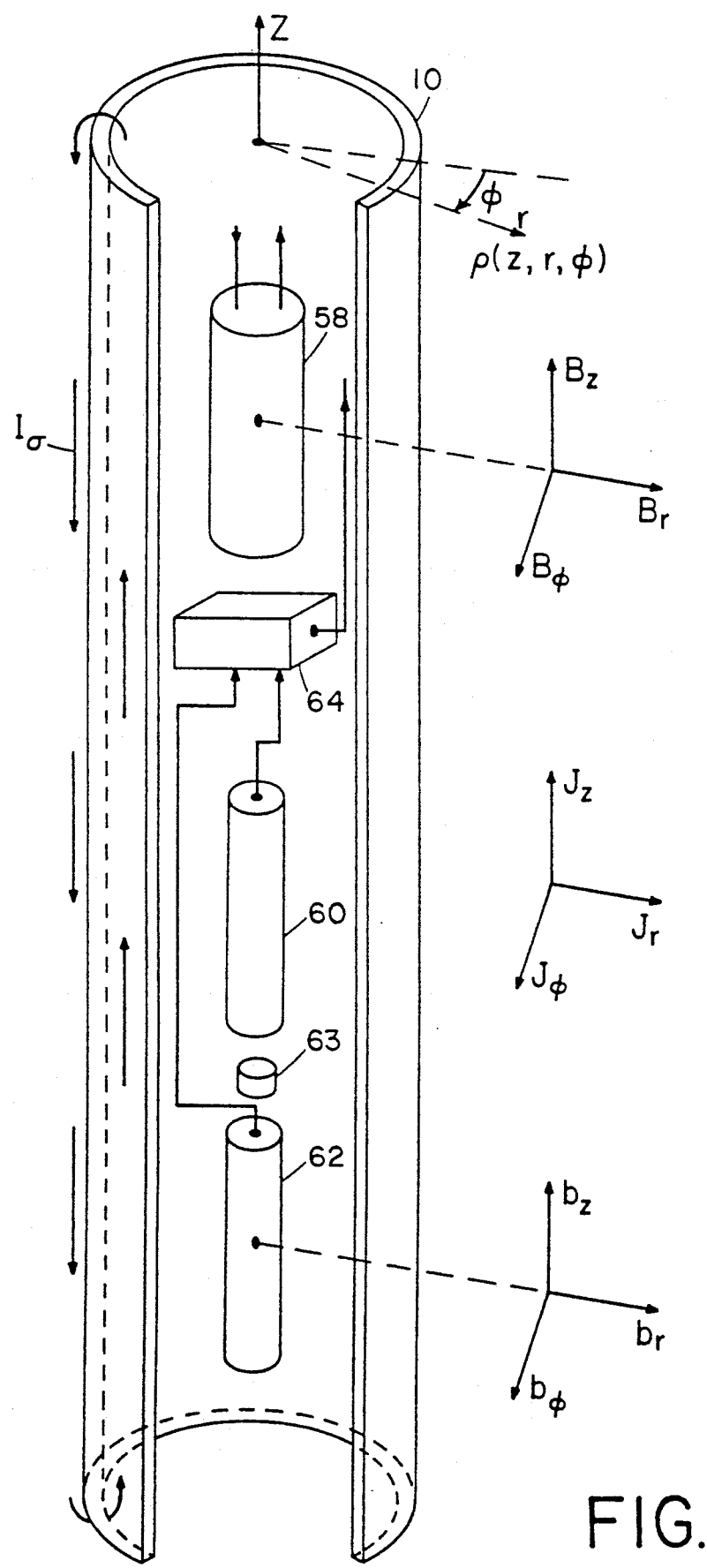
FIG. 4 is a generalized conceptual drawing showing the cylindrical components of the primary A.C. magnetic field (the excitation field), the resulting currents flowing in formation, the surface currents flowing on the casing, and the secondary magnetic fields generated by the flowing currents.

FIG. 4 shows a conceptualized measurement situation inside a borehole casing. A primary excitation source of A.C. magnetic field 58 produces a general longitudinal ($B_z$), radial ($B_r$), and azimuthal ($B_\phi$) components of the A.C. magnetic field at any position within the formation. The formation resistivity and other physical parameters are a function of z, r, and $\phi$. The primary source fields generate eddy currents at any position of magnitude $J_z$, $J_r$, and $J_\phi$. These flowing currents then produce secondary fields $b_z$, $b_r$, and $b_\phi$. Along with the primary fields, these secondary fields are measured with longitudinal A.C. magnetic field sensors 60 and 62, whose respective outputs are differentially processed by electronics 64.

In general, the radial components $B_r$ do not penetrate the casing, and any components $b_r$ produced will not be measurable inside the casing. The source field $B_z$ can penetrate the casing at low frequencies, and the secondary component $b_z$ can be measured with induction coils as was the case in FIG. 1. In FIG. 4, elements 60 and 62 are induction coils similar in nature to induction coils I1 and I2 described in FIG. 1 which are sensitive to longitudinal components of the A.C. magnetic field on the interior of the borehole casing. The calibration coil 63 is used to balance the gradiometer as already described for FIG. 1. Difference electronics 64 in FIG. 4 differentially substracts the signals from induction coils 60 and 62 respectively and provides the output of the A.C. magnetic gradiometer. The magnetic gradiometer can be operated at different frequencies as already described. In addition, useful geophysical information can also be obtained from using just one induction coil to measure the response to the excitation source which is operated at several different frequencies between 0.001 Hz and 20 Hz. Such measurements are to be repeated at many different vertical positions while keeping the distance of separation fixed between the source and the one induction coil. Such a log provides information responsive to the casing and the adjacent geological formation. Provided the data is averaged over suitable vertical distances, the influence of the casing may be minimized thereby yielding information concerning the adjacent geological formation as desired.

Figure 5:
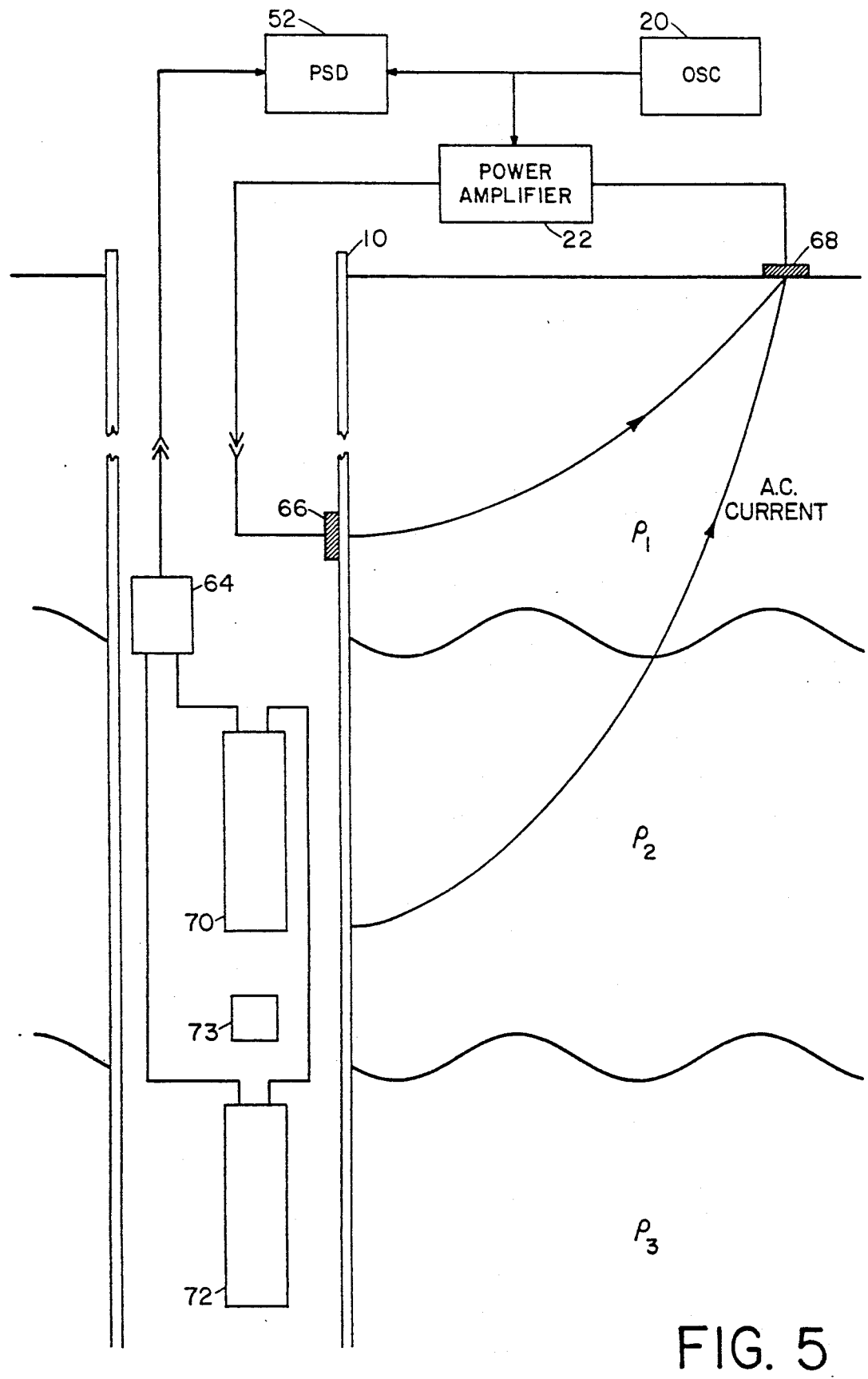
FIG. 5 is another embodiment of the invention wherein the source of the exciting field is derived by passing A.C. current through formation.

FIG. 5 shows yet another embodiment of the invention. Many of the elements have been defined, but here power amplifier 22 delivers A.C. current to electrode 66 placed in electrical contact with the casing. The current is subsequently conducted by various processes to electrode 68 which is in electrical contact with the surface of the earth. Induction coils 70 and 72 are conceptually similar in nature to induction coils I1 and I2 in FIG. 1 and are responsive to only longitudinal components of the A.C. magnetic field inside the borehole casing. Calibration coil 73 is also shown which is used to balance the A.C. magnetic gradiometer. Here, A.C. currents which flow along the casing do not cause a signal output of the gradiometer because such currents do not produce magnetic fields with components parallel to the casing. However, the A.C. currents which flow through formation tend to flow along relatively less resistive zones. Various resistive zones are shown in FIG. 5 with resistivities respectively $\rho_1$, $\rho_2$, and $\rho_3$. For example, if $\rho_2 < \rho_1$ then more current would flow through $\rho_2$ than through $\rho_1$. Such A.C. currents would produce A.C. magnetic fields with longitudinal components inside the borehole casing and would therefore produce measurements indicating the relative resistivity of the adjacent formations. The difference in the outputs of the sensors performed by electronics 64 is sensitive to formation resistivities in different geological layers shown as $\rho_1$, $\rho_2$, and $\rho_3$ in FIG. 5. Currents of different frequencies can be conducted through formation, and the magnetic gradiometer can be operated at the different frequencies as already described. In addition, useful geophysical information may also be obtained from using just one induction coil to measure the response to conducting A.C. currents through formation at various different frequencies between 0.001 Hz and 20 Hz. While keeping the distance of separation fixed between the source of the A.C. current applied to the casing and the one sensing induction coil, such measurements are to be repeated at many different vertical positions. Such a log provides information responsive to the casing and the adjacent geological formation. Provided the data is averaged over suitable vertical distances, the influence of the casing may be minimized thereby yielding information concerning the adjacent geological formation as desired.

Figure 6:
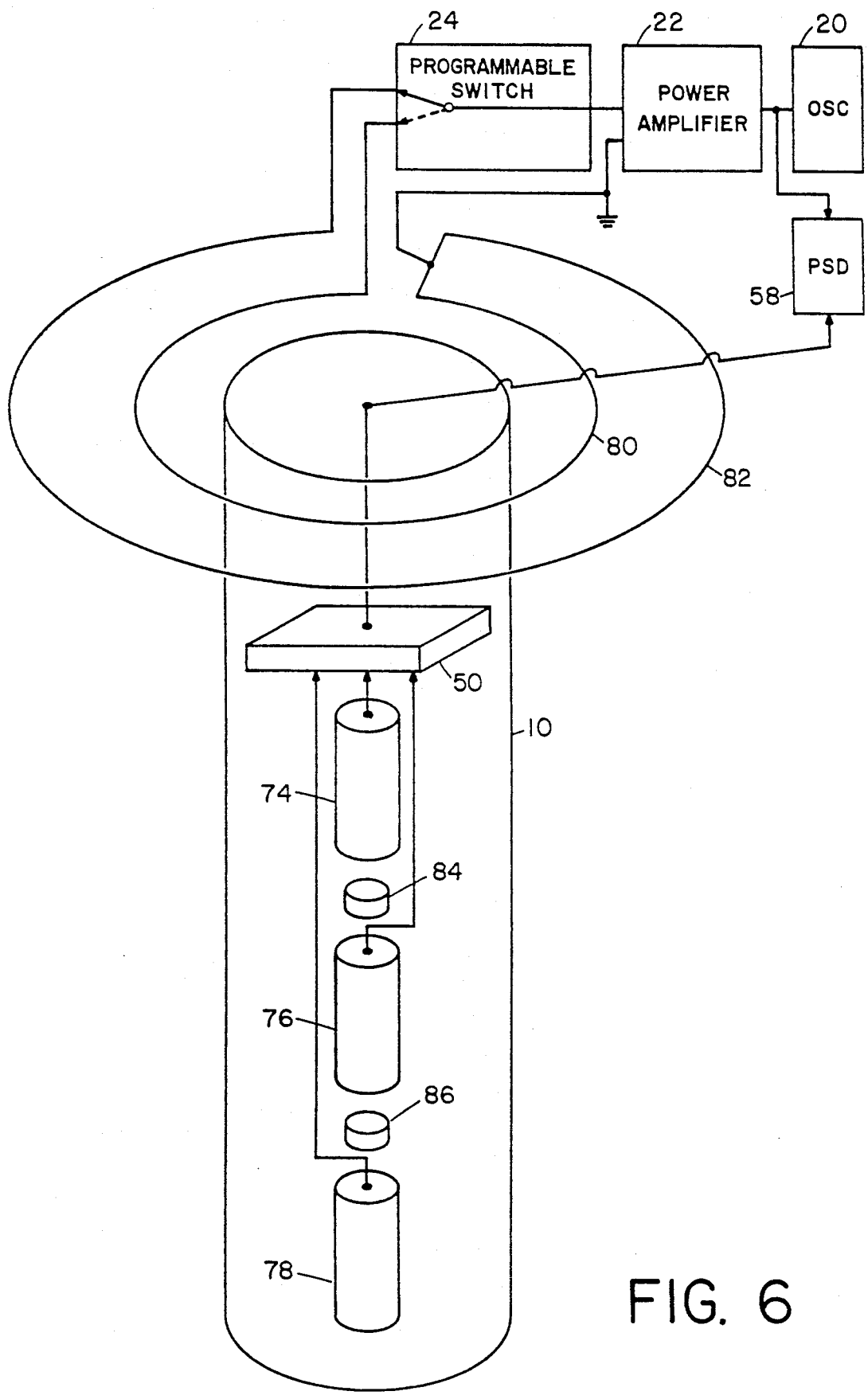
FIG. 6 is another embodiment of the invention wherein the sources of the exciting fields are A.C. current carrying loops of insulated wire on the surface of the earth which are concentric with the casing.

FIG. 6 shows a variant of the invention shown in FIG. 1. Here many of the elements have already been defined. As is the case in FIG. 1, three induction coil assemblies 74, 76, and 78 respectively are sensitive to the secondary longitudinal magnetic fields sensed through the casing. However, the primary excitation A.C. magnetic fields are not generated from inside the casing, but instead are due to turns of insulated wire 80 and 82 respectively which are disposed on the surface of the earth and which are concentric with the borehole casing. However, the theory of operation of the embodiment of the invention shown in FIG. 6 is similar to that shown in FIG. 1. Wire 80 is typically 10 meters in diameter and capable of carrying at least 10 amps peak-to-peak, and wire 82 is typically 20 meters in diameter and also capable of carrying 10 amps peak-to-peak. The frequency of operation is typically 0.001 Hz to 20 Hz to allow deep penetration of the earth, and to allow the A.C. magnetic fields to penetrate the casing. Calibration coils 84 and 86 are used to balance the appropriate pairs of the induction coils when performing differential measurements. First, wire 80 is energized, and induction coils 74 and 76 are used in a differential manner. Then, wire 82 is energized and induction coils 74 and 76 are still used in a differential manner. Two independent measurements at the same vertical position gives separately the formation and casing response. In addition, measurements at several different frequencies such as 0.01 Hz, 1 Hz, and 10 Hz can be used to separate the casing and formation responses. And finally, useful geophysical information may also be obtained from using just one induction coil to measure the response to a single excitation source located on the surface of the earth which is operated at the various different frequencies. Such measurements at the different frequencies are to be repeated after placing the single induction coil at different vertical positions within the cased borehole. Such a log provides information responsive to the casing and the adjacent geological formation. Provided the data is averaged over suitable vertical distances, the influence of the casing may be minimized thereby yielding information concerning the geological formation as desired.

Several embodiments of the invention have been shown explicitly in FIGS. 1, 4, 5 and 6. The embodiments of the invention described to this point provide at least the following four fundamental "Methods" which are methods of measurement:

Method I: In the embodiments of the invention described to this point, a low frequency A.C. magnetic field is generated which is called the primary source A.C. magnetic field. Said field can be generated by at least several common means: A) passing A.C. current through conductive wires which are insulated from the earth; or B) passing A.C. current through a combination of conductive wires which are insulated from the earth and in addition conducting said A.C. current through a portion of the earth as a part of the A.C. current conducting circuit; and C) less conventional means not shown to this point including using mechanical modulation of permanent magnets and electromagnetic modulation of permanent magnets. (It is understood that said sources may be placed in many different geometric configurations in the oil field and A.C. magnetic fields generated in many different ways as described at length below in the further analyses of the many subcategories of Methods I-A and Methods I-B.)

Method II: In all of the embodiments of the invention described, the longitudinal component of the low frequency A.C. magnetic field is detected at a minimum of one vertical position from within the cased borehole to be measured which is to be called the "first cased borehole" during the remaining disclosure. The total longitudinal component measured at any one vertical position within the first cased borehole can be resolved into two components: the primary longitudinal component due to the primary source A.C. magnetic field; and the secondary longitudinal component the A.C. magnetic field produced by eddy currents caused to flow in the geological formation, in the casing, in any cement which may be present around the casing, and in the mud and fluids within the hole. Said eddy currents are responsive to the resistivities of the conductive media surrounding the longitudinal A.C. magnetic field detector. (Said secondary component in principle also includes all extra components added to the A.C. magnetic field which are generated in response to said primary source field. Extra components due to any non-linear processes including rectification phenomena and other physical processes related to various electrochemical phenomena associated with conducting current through actual geological formations add vectorially to the secondary component of the A.C. magnetic field described). It is also recognized that various A.C. magnetic detection means responsive to the longitudinal components of the A.C. magnetic field include the following: A) induction coils with ferromagnetic cores; B) induction coils with air cores; C) induction coils with ferromagnetic cores whose length is at least 10 times longer than any other lateral dimension of the induction coil; D) induction coils with air cores whose length is at least 10 times longer than any other lateral dimension of the induction coil; E) Hall effect devices oriented suitably to be sensitive to the longitudinal components of the A.C. magnetic field; F) proton precession magnetometers which are modified to be sensitive to the longitudinal components of the A.C. magnetic field; G) optical pumping magnetometers which are oriented suitably to measure longitudinal components of the A.C. magnetic field; H) any type of semiconductor device which is sensitive to the longitudinal components of the A.C. magnetic field; and I) virtually any device which measures the longitudinal component of magnetic fields and which can be placed inside a borehole casing.

Method III: In all of the embodiments of the invention described to this point, the longitudinal A.C. magnetic field detection measurement methodology may be characterized as one of the following: A) a single detector measuring the magnitude of the longitudinal component of the A.C. magnetic field which is located at one vertical position within the first cased hole; B) two detectors measuring a differential output responsive to the difference between the magnitudes of the longitudinal components of the A.C. magnetic fields which are present at the two different vertical locations of the two detectors where all of said detectors are vertically disposed within said first cased borehole; C) two detectors measuring a differential output responsive to the difference between the magnitudes of the longitudinal components of the A.C. magnetic fields which are present at the specific locations of the two detectors where at least one of said detectors is located within the first cased borehole and where said second detector may or may not be located within said first cased borehole; D) three or more detectors measuring differential outputs responsive to the differences between the magnitudes of the longitudinal components of the A.C. magnetic fields at the many different vertical positions of said detectors within said first cased borehole where all of said detectors are vertically disposed within said first cased borehole; E) three or more detectors measuring differential outputs responsive to the differences between the magnitudes of the longitudinal components of the A.C. magnetic fields which are located at the many different locations where at least one of said detectors is located within the first cased hole and where said remaining detectors may or may not be located within said first cased borehole; and F) two or more detectors measuring differential outputs responsive to the differences between the magnitudes of the longitudinal components of the A.C. magnetic fields provided by the first detector located in the first cased borehole and the total components of the magnetic fields appearing at the other detectors which may or may not be located within said first cased borehole. Possible unspecified locations for the remaining detectors include the following locations: in the first cased borehole; in a second cased borehole; in an uncased borehole; and on the surface of the earth, etc. It is understood, however, that in general, measurements of the longitudinal component of the A.C. magnetic field provided by the detector in the first cased borehole are generally to be repeated at many different vertical positions thereby providing a "log" usually desired by the industry.

Method IV: In the embodiments described to this point, the longitudinal A.C. magnetic field may be measured at the following frequencies: A) at just one frequency between 0.001 Hz and 20 Hz; and B) at two or more different frequencies between 0.001 Hz and 20 Hz.

For the sake of brevity, the invention includes using in combination and permutations of all the following individual Methods which comprise many overall detailed Procedures. Such Procedures are characterized by the following choices: Method I-A or Method I-B or Method I-C; used in combination with Method II-A, or Method II-B, or Method II-C, or Method II-D, or Method II-E, or Method II-F, or Method II-G, or Method II-H, or Method II-I; used in combination with Method III-A, or Method III-B, or Method III-C, or Method III-D, or Method III-E or Method III-F; and used in combination with Method IV-A or Method IV-B.

In addition there are many different ways of passing current through the earth as defined in the general Method I-B above. In particular, it is useful to present the many different experimental ways current is passed through the earth for the particular Procedure defined as follows: Method I-B, in combination with Method II-A, in combination with Method III-A, and in combination with Method IV-B. This particular Procedure is briefly defined as follows: the primary excitation source is to pass current through the earth; the A.C. magnetic field is to be measured with an induction coil which has a ferromagnetic core; a single detector is to provide measurements in said first cased borehole; and measurements are to be performed at two or more frequencies between 0.001 Hz and 20 Hz.

However, it is still necessary to describe how the current is to be passed through the earth for specificity here. Listing said different ways to pass current through the formation for this particular Procedure also defines the various subcategories of Method I-B in general which are listed as follows:

Method I-B (1): passing A.C. current from one electrode in electrical contact with the interior of the first cased borehole to one electrode located on the surface of the earth and which is in electrical contact with the surface of the earth.

Method I-B (2): passing A.C. current from one or more electrodes in electrical contact with the interior of the first cased borehole to one or more electrodes located on the surface of the earth and which are in electrical contact with the surface of the earth.

Method I-B (3): passing A.C. current from one electrode in electrical contact with the interior of the first cased borehole to one electrode attached to and in electrical contact with the portion of said first casing which protrudes above the surface of the earth.

Method I-B (4): passing A.C. current from one or more electrodes in electrical contact with the interior of the first cased borehole to one or more electrodes attached to and in electrical contact with the portion of said casing which protrudes above the surface of the earth.

Method I-B (5): passing A.C. current from one electrode in electrical contact with the interior of the first cased borehole to one electrode which is in electrical contact with the interior of a second cased borehole.

Method I-B (6): passing A.C. current from one or more electrodes in electrical contact with the interior of the first cased borehole to one or more electrodes which are in electrical contact with the interior of a second cased borehole.

Method I-B (7): passing A.C. current from one electrode in electrical contact with the interior of the first cased borehole to an electrode attached to and in electrical contact with a portion of a second borehole casing which is above the surface of the earth.

Method I-B (8): passing A.C. current from one or more electrodes in electrical contact with the interior of the first cased borehole to one or more electrodes attached to and in electrical contact with a portion of a second borehole casing which is above the surface of the earth.

Method I-B (9): passing A.C. current from one electrode in electrical contact with the interior of the first cased borehole to an electrode attached to and in electrical contact with the interior wall of a second open, or uncased, borehole.

Method I-B (10): passing A.C. current from one or more electrodes in electrical contact with the interior of the first cased borehole to one or more electrodes attached to and in electrical contact with the interior wall of a second open, or uncased, borehole.

Method I-B (11): passing A.C. current from one electrode attached to and in electrical contact with the portion of the first borehole casing which protrudes above the surface of the earth to an electrode attached to and in electrical contact with the portion of a second borehole casing which protrudes above the surface of the earth.

Method I-B (12): passing A.C. current from one or more electrodes attached to and in electrical contact with the portion of the first borehole casing which protrudes above the surface of the earth to one or more electrodes attached to and in electrical contact with the portion of a second borehole casing which protrudes above the surface of the earth.

Method I-B (13): passing A.C. current from one electrode in electrical contact with the portion of the first borehole casing which protrudes above the surface of the earth to an electrode in electrical contact with interior of a second borehole casing.

Method I-B (14): passing A.C. current from one or more electrodes in electrical contact with the portion of the first borehole casing which protrudes above the surface of the earth to one or more electrodes in electrical contact with the interior of a second borehole casing.

Method I-B (15): passing A.C. current from one electrode in electrical contact with the portion of the first borehole casing which protrudes above the surface of the earth to one electrode in electrical contact with the interior of a second open, or uncased, borehole.

Method I-B (16): passing A.C. current from one or more electrodes in electrical contact with the portion of the first borehole casing which protrudes above the surface of the earth to one or more electrodes in electrical contact with the interior of a second open, or uncased, borehole.

Method I-B (17): passing A.C. current from one electrode in electrical contact with the portion of the first borehole casing which protrudes above the surface of the earth to one electrode in electrical contact with the surface of the earth remote from said first borehole casing.

Method I-B (18): passing A.C. current from one or more electrodes in electrical contact with the portion of the first borehole casing which protrudes above the surface of the earth to one or more electrodes in electrical contact with the surface of the earth remote from said first borehole casing.

Method I-B (19): passing A.C. current from one electrode in electrical contact with any portion of the first borehole casing to two or more electrodes in electrical contact with any portions of two or more boreholes which may be cased boreholes or open boreholes.

Method I-B (20): passing A.C. current from one or more electrodes in electrical contact with any portion of the first borehole casing to two or more electrodes in electrical contact with any portions of two or more boreholes which may be cased boreholes or open boreholes.

Method I-B (21): while performing measurements of the longitudinal components of the A.C. magnetic field inside the first borehole casing, passing current between an electrode in electrical contact with any portion of a second borehole casing to an electrode in electrical contact with any portion of a third borehole casing.

Method I-B (22): while performing measurements of the longitudinal component of the A.C. magnetic field inside the first borehole casing, passing current between an electrode in electrical contact with any portion of a second borehole casing to an electrode in electrical contact with the surface of the earth.

Method I-B (23): while performing measurements of the longitudinal component of the A.C. magnetic field inside the first borehole casing, passing current between an electrode in electrical contact with any portion of a second borehole casing to an electrode in electrical contact with any portion of a second open hole, or uncased, borehole.

Method I-B (24): while performing measurements of the longitudinal component of the A.C. magnetic field inside the first borehole casing, passing current between an electrode in electrical contact with any portion of a second borehole casing to two or more electrodes which may be attached to two or more electrodes in electrical contact with cased boreholes, uncased boreholes, or the surface of the earth.

Method I-B (25): while performing measurements of the longitudinal component of the A.C. magnetic field inside the first borehole casing, passing current between two or more electrodes which are in electrical contact with the surface of the earth.

Still other methods of conducting current through formation are obvious, but this list is terminated here for the sake of brevity. For example, in all the Methods cited, one or more extra calibration sources can be used to calibrate said detectors which may be located inside the first cased borehole, in another cased or open borehole, or on the surface of the earth. Furthermore, many additional methods may be devised which alter from one measurement configuration to another thereby providing an alternating measurement signal that in essence reveals differences between one geological region and another. The point is that the invention provides numerous methods for passing A.C. current through formation which results in the production of many different types primary source fields.

Another useful detailed Procedure may be defined by the following: Method I-A, used in combination with Method II-A, used in combination with Method III-D, and used in combination with Method IV-B. Again, there are many ways to pass current through insulated wires as defined by Method I-A. Therefore, the following subcategories of Method I-A are listed as follows:

Method I-A (1): conducting A.C. current through an insulated wire on the surface of the earth which is circular and concentric with said first cased borehole.

Method I-A (2): conducting A.C. current through an insulated wire on the surface of the earth which is circular and which is not concentric with said first cased borehole;

Method I-A (3): conducting A.C. current alternatively through a first insulated circular wire on the surface of the earth which is concentric with said first cased borehole and which has a first diameter, and then through a second insulated circular wire on the surface of the earth which is concentric with said first cased borehole and which has a second diameter.

Method I-A (4): conducting A.C. current alternatively through a first insulated circular wire on the surface of the earth which is concentric with said first cased borehole and which has a first diameter, and then through a second insulated circular wire on the surface of the earth which not concentric with said first cased borehole whose center is located a distance from said first cased borehole and which has a second diameter.

Method I-A (5): conducting A.C. current through an insulated wire on the surface of the earth which forms a rectangular array which is symmetric with the position of said first borehole casing.

Method I-A (6): conducting A.C. current through an insulated wire on the surface of the earth which forms a rectangular array where one side of said rectangular array is much closer to said first borehole casing than said other remaining sides of the rectangular array.

Method I-A (7): conducting A.C. current through an insulated wire on the surface of the earth which has any geometric shape and which may be located at any distance from said first cased borehole.

Method I-A (8): conducting A.C. current through an insulated superconducting wire on the surface of the earth which has any geometric shape and which may be located at any distance from said first cased borehole.

Method I-A (9): conducting A.C. current through a solenoid having an air core which is placed at a specific distance of separation from the A.C. magnetic detector means in said first cased borehole.

Method I-A (10): conducting A.C. current through a solenoid having a ferromagnetic core which is placed at a specific distance of separation from the detector means in the first cased borehole.

Method I-A (11): conducting A.C. current through a solenoid having an air core which is placed on the surface of the earth.

Method I-A (12): conducting A.C. current through a solenoid having a ferromagnetic core which is placed on the surface of the earth.

Method I-A (13): while performing measurements with the detector sensitive to the longitudinal component of the A.C. magnetic field in the first cased borehole, conducting A.C. current through a solenoid which has an air core which is located inside a second cased borehole.

Method I-A (14): while performing measurements with the detector sensitive to the longitudinal component of the A.C. magnetic field in the first cased borehole, conducting A.C. current through a solenoid which has a ferromagnetic core which is located inside a second cased borehole.

Method I-A (15): while performing measurements with the detector sensitive to the longitudinal component of the A.C. magnetic field in the first cased borehole, conducting A.C. current through a solenoid which has an air core which is located inside a second open, or uncased, borehole.

Method I-A (16): while performing measurements with the detector sensitive to the longitudinal component of the A.C. magnetic field in the first cased borehole, conducting A.C. current through a solenoid which has a ferromagnetic core which is located inside a second open, or uncased, borehole.

Method I-A (17): while performing measurements with the detector sensitive to the longitudinal component of the A.C. magnetic field in the first cased borehole, conducting A.C. current alternatively first through a first solenoid which has an air core located at a first distance above the detector means in said first cased borehole, and then alternatively conducting A.C. current through a second solenoid which has an air core located at a second distance above the detector means in said first cased borehole.

Method I-A (18): while performing measurements with the detector sensitive to the longitudinal component of the A.C. magnetic field in the first cased borehole, conducting A.C. current alternatively first through a first solenoid which has a ferromagnetic core located a first distance above the detector means in said first borehole, and then alternatively conducting A. C. current through a second solenoid which has a ferromagnetic core located at a second distance above the detector means in said first cased borehole.

Method I-A (19): while performing measurements with the detector sensitive to the longitudinal component of the A.C. magnetic field in the first cased borehole, conducting A.C. current alternatively first through a first solenoid which has an air core located a first distance above the detector means in said first cased borehole, and then alternatively conducting A.C. current through a second solenoid which has an air core located on the surface of the earth.

Method I-A (20): while performing measurements with the detector sensitive to the longitudinal component of the A.C. magnetic field in the first cased borehole, conducting A.C. current alternatively first through a first solenoid which has a ferromagnetic core located a first distance above the detector means in said first cased borehole, and then alternatively conducting A.C. current through a second solenoid which has a ferromagnetic core located on the surface of the earth.

Method I-A (21): while performing measurements with the detector sensitive to the longitudinal component of the A.C. magnetic field in the first cased borehole, conducing A.C. current alternatively first through an insulated circular shaped wire on the surface of the earth disposed symmetrically around the first cased borehole, and then conducting A.C. current through a solenoid with an air core located inside a second borehole casing.

Method I-A (22): while performing measurements with the detector sensitive to the longitudinal component of the A.C. magnetic field in the first cased borehole, conducing A.C. current alternatively first through an insulated circular shaped wire on the surface of the earth disposed symmetrically around the first cased borehole, and then conducting A.C. current through a solenoid with a ferromagnetic core located inside a second cased hole.

Method I-A (23): while performing measurements with the detector sensitive to the longitudinal component of the A.C. magnetic field in the first cased borehole, conducting A.C. current alternatively first through a first solenoid with an air core which is located at a first vertical position within a second cased borehole, and then conducting A.C. current through a second solenoid with an air core which is located at a second vertical position within said second cased borehole.

Method I-A (24): while performing measurements with the detector sensitive to the longitudinal component of the A.C. magnetic field in the first cased borehole, conducting A.C. current alternatively first through a first solenoid with a ferromagnetic core which is located at a first vertical position within a second cased borehole, and then conducting A.C. current through a second solenoid with a ferromagnetic core which is located at a second vertical position within said second cased borehole.

Still other methods are obvious for conducting current through insulated wires located in various parts of an oil field, but this list is terminated here for the sake of brevity. For example, in all the Methods cited, one or more extra calibration sources can be used to calibrate said detectors which may be located inside the first cased borehole, in another cased or open borehole, or on the surface of the earth. Furthermore, many additional methods may be devised which alter from one measurement configuration to another thereby providing an alternating measurement signal that in essence reveals differences between one geological region and another. An example of such an alternative measurement technique is described in Method I-A (4), but there exist many variations on that basic idea. The point is that the invention provides for a wide variety of methods for conducting A.C. current through insulated wires which result the production of many different primary source fields.

It should be restated here that the invention provides for an enormous number of different Procedures. These different Procedures can be listed as follows:

Method I-A (1), or I-A(2), . . . , or I-A(24), or Method I-B(1), or I-B (2), . . . , I-B (25);

In combination with Method II-A, or II-B, or II-C, or II-D, or II-E, or II-F, or II-G, or II-H, or II-I;

In combination with Method III-A, or III-B, or III-C, or III-D, or III-E, or III-F;

In combination with Method IV-A or IV-B.

For example, the invention shown in FIG. 1 can be described by the following Procedure: Method I-A (18); in combination with Method II-C; in combination with Method III-D; in combination with either Method IV-A or Method IV-B.

Similarly, FIG. 5 can be described by the following Procedure: Method I-B (1); in combination with Method II-C; in combination with Method III-B; in combination with either Method IV-A or Method IV-B.

And finally, FIG. 6 can be described by the following Procedure: Method I-A (3); since it was not specified, either Methods II-A, II-B, II-C or II-D; in combination with Method III-D; in combination with either Method IV-A or Method IV-B.

To select the ideal Procedure for a given problem in an oil field, the following generalities should be noted. The response of a magnetic gradiometer is related to its overall dimensions. For example, a gradiometer whose sensors are separated by 5 meters will probably have a sensitivity to geophysical properties up to approximately 5 meters away from the gradiometer. On the other hand, a single magnetic detector is responsive to fields generated great distances away. Therefore, a single sensor is sensitive to fields generated at great distances whereas a gradiometer is sensitive to local changes in fields.

Therefore, to measure resistivity changes in geological formations immediately adjacent to a cased borehole, a gradiometer is naturally to be used as shown explicitly in FIGS. 1, 4, 5, and 6.

It is also stated in the text however, that the inventions shown in FIGS. 1, 4, 5 and 6 can also be operated in a mode where only one single sensor is used (the other sensors in the gradiometer are therefore not used, or disconnected). In this case, the embodiments used in this manner are sensitive to geological formations relatively distant from the cased hole.

Figure 7:
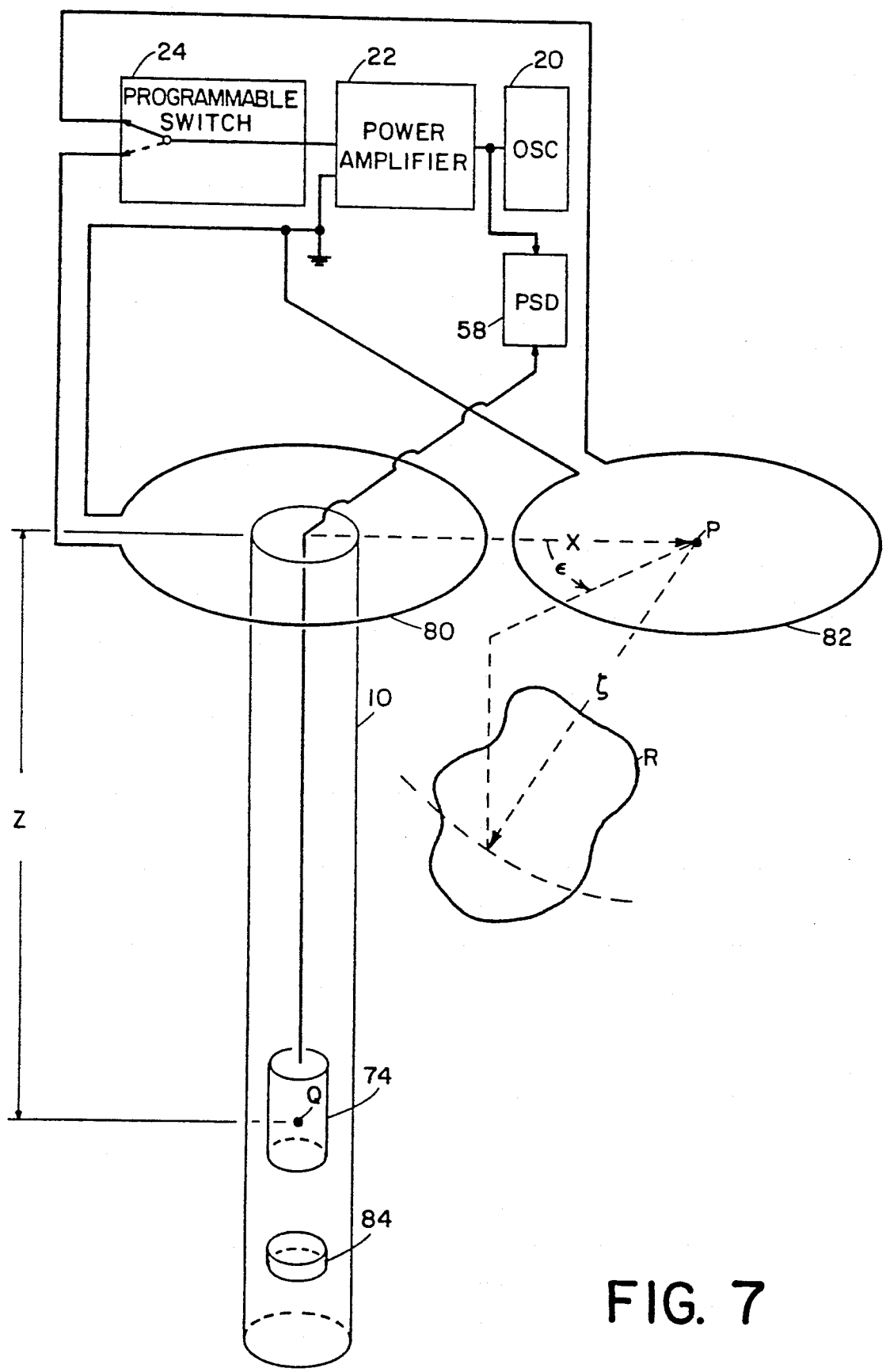
FIG. 7 is another embodiment of the invention wherein the sources of the exciting fields are two A.C. current carrying loops of insulated wire on the surface of the earth, one of which is concentric with the casing, and the other of which is located a horizontal distance away from said casing.

In addition, the invention clearly provides for the measurement of the average resistivity of large portions of an oil reservoir. For example consider FIG. 7 which embodies the following Procedures: Method I-A (4); in combination with Method II-A; in combination with Method III-A; in combination with Method IV-B. It should be noted that FIG. 7 is very similar to FIG. 6 in that all the numbered elements are the same. In FIG. 6, circular insulated wire 82 is concentric with the first cased borehole and is located on the surface of the earth. In FIG. 7, circular insulated wire 82 has been moved to a position where the center if said circle P is a distance X away from the first cased borehole. Initially, wire 80 is energized with A.C. current. When wire 82 is alternatively energized, then the changes observed are related to the resistivity in region R and the distance of separation between the detector and point P.

Fields generated by the circular wire 82 decrease in depth Z and position X from the first cased borehole. The A.C. magnetic fields generated will attenuate along the distance $\zeta$ which is the distance of investigation along a line from point P to point Q, the center of the sensor in the first cased borehole. In the simplest of approximations, it is first assumed that no earth is present and the vector magnetic field generated by the circular wire is given by $B_o(X, Z, \epsilon)$ where $\epsilon$ is the azimuthal position shown in FIG. 7. (The A.C. magnetic field from said circular loop in the absence of the earth is to be calculated from *Concepts in Electricity and Magnetism*, Reuben Benumof, Holt, Rinehart and Winston, N.Y., 1961, Equation 10.1, page 164). In addition, the conductive nature of the earth also attenuates said A.C. fields. An exact calculation of the fields according to *Fields and Waves in Communication Electronics*, op. cit., Equations 5, 6, and 7 on page 149, subject to boundary conditions, provides a detailed solution. Much theoretical work on this subject is also provided in *Frequency and Transient Soundings*, by Alexander A. Kaufman and George V. Keller, Elsevier, N.Y., 1983, particularly in Chapters 1, 3, 5 and 7. Therefore the exact A.C. magnetic field may be obtained from assumed geophisical properties which is $B(X,Z,\epsilon)$. However, a first simple approximation to the exact solution which basically shows how the invention works is given by an exponentially attenuated magnetic field as follows:

$$B(X,Z,\epsilon) = B_o(X,Z,\epsilon)e^{-\zeta/\delta} \qquad \text{Eq. 2}$$

Here, $\delta$ is given by Eq. 1. Therefore, detector 74 measures the response to alternatively applied fields from wire 80 and then 82 for several different frequencies between 0.001 Hz and 20 Hz, and then said data is repeatedly acquired at many different vertical positions Z. By measuring the departure of the measured A.C. magnetic fields with detector 74 from the theoretically predicted values without the conductive earth being present provides information concerning regions such as R shown in FIG. 7. The calibration coil 84 is used to determine the average response of the sensor 74 to calibration fields at different frequencies which can be used to determine the influence of the actual casing present on the response of the detector 74. Therefore, methods and apparatus have been described which measure geological formation properties great distances away from said first cased borehole.

Figure 8:
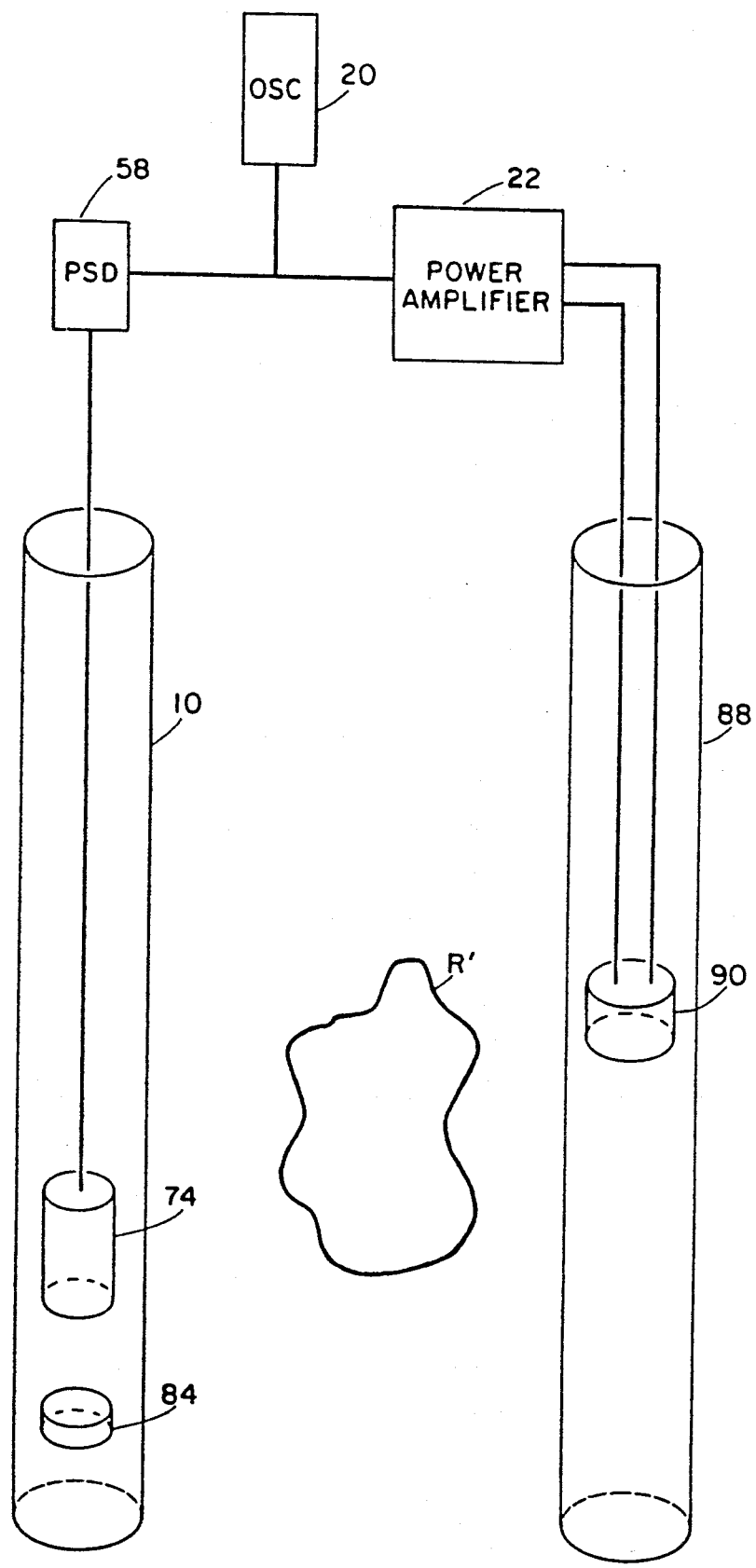
FIG. 8 is another embodiment of the invention wherein measurements of the longitudinal components of the A.C. magnetic field are performed in a first cased borehole in response to A.C. magnetic fields generated within a second cased borehole.

Another embodiment of the invention is shown in FIG. 8 which also provides for measurements of the average resistivity of large portions of an oil reservoir. The invention is shown in FIG. 8 which requires the following Procedure: Method I-A (13); in combination with Method II-A; in combination with Method III-A; in combination with Method IV-B.

Most of the elements have already been described in FIG. 8 including the longitudinal A.C. magnetic field detector 74. However, another cased borehole 88 is present in the oil field, and an air core solenoid 90 is suitably energized by the power amplifier 22. It is evident that in such a geometry, the average resistivity of the region R' affects the magnitude of the longitudinal A.C. magnetic field seen inside cased hole 10. There are many ways to take data here effectively. One method is as follows. For a given vertical position of source 90, measure the response of longitudinal detector 74 at many different vertical positions. Then change the position of source 90 and measure the response of longitudinal detector 74 at many different vertical positions. After this process is repeated several times, sufficient data is obtained to infer the average resistivity of regions such as R' shown in FIG. 8.

Figure 9:
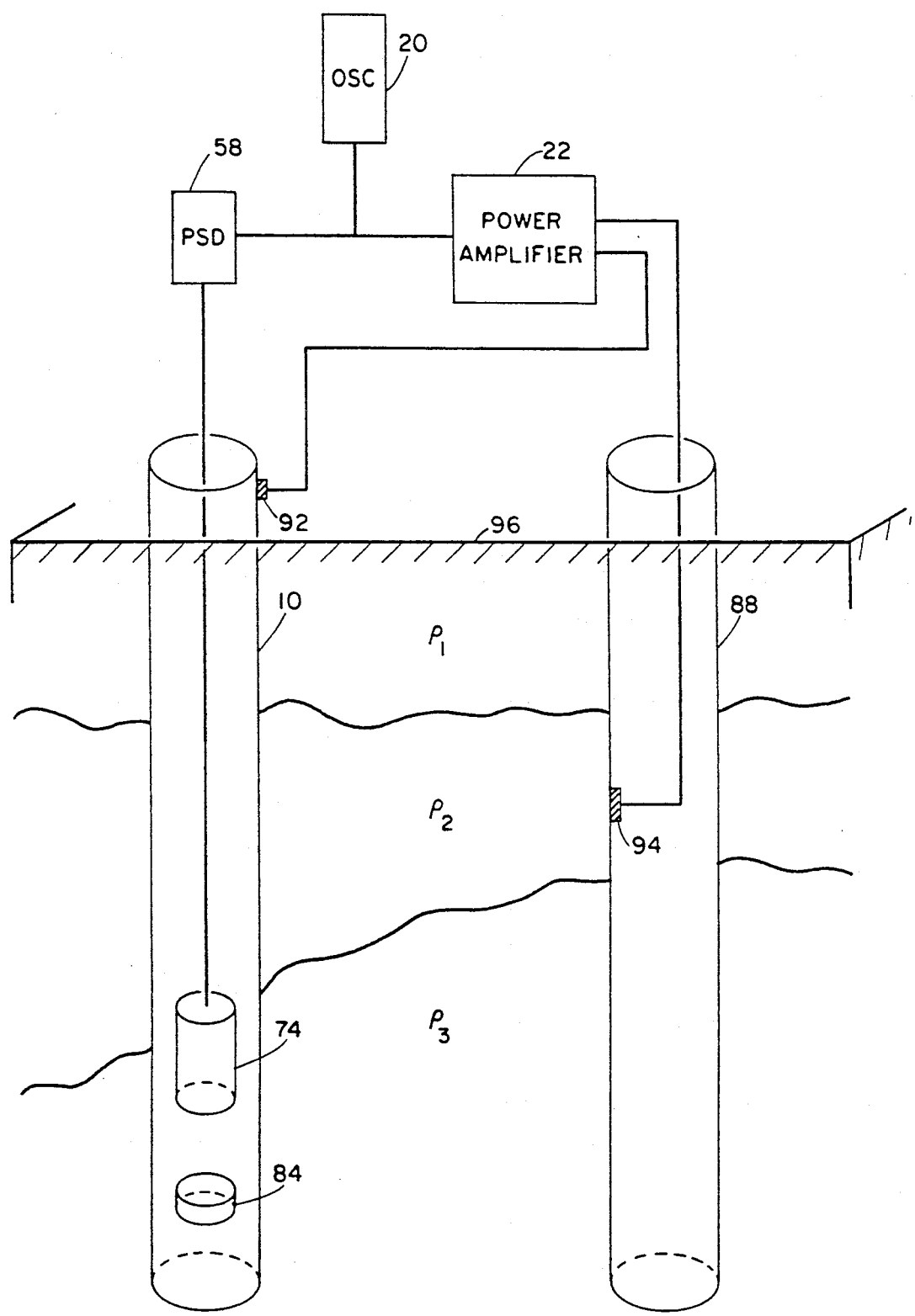
FIG. 9 is another embodiment of the invention wherein measurements of the longitudinal components of the A.C. magnetic field are made in a first cased borehole in response to current conducted from an electrode attached to the top of the casing of the first cased borehole to an electrode in electrical contact with the interior of a second cased borehole.

And finally, FIG. 9 shows another embodiment of the invention. The method used here may be succinctly described as follows: Method I-B (13); in combination with II-A; in combination with Method III-A; in combination with Method IV-B. Here, almost all of the elements have already been defined. In addition, the power amplifier in this embodiment conducts current from an electrode 92 in electrical contact with the portion of the first borehole casing protruding from the surface of the earth to an electrode 94 which is in electrical contact with the interior of the second cased borehole. The surface of the earth 96 is shown here for clarity. Clearly, the size of the longitudinal A.C. magnetic field measured by 74 is dependent upon the relative resistivity of various formations between the cased holes shown respectively as $\rho_1$, $\rho_2$, and $\rho_3$ in FIG. 9.

In this particular example, and in others, it is generally true of course that the measured longitudinal component of the A.C. magnetic field inside the cased well is due to the vector sum of the primary source of exciting A.C. magnetic fields and the resulting secondary A.C. magnetic fields generated by the presence of the casing and by the presence of the geological formations.

It should be noted that phase sensitive detector 58 in FIG. 9 has an in-phase output and an out-of-phase output. These in-phase and out-of-phase outputs were already briefly defined in the text of the description of element 58 in FIG. 1, and they are explicitly shown as "I" and "O" respectively in element 58 in FIG. 1. (Element No. 58 in FIGS. 1, 5, 6, 7, 8, and 9 all have an in-phase output "I", and an out-of-phase output "O", even if these outputs are not explicitly shown on the drawings). An example of such a phase sensitive detector is the Model "5204 Lock-In Analyzer" manufactured by EG&G Princeton Applied Research Corporation located in Princeton, N.J., which possesses an in-phase output and an out-of-phase output incorporated into one instrument.

Referring again to FIG. 9, using standard experimental instrumentation and techniques used with phase sensitive detection equipment, the "in-phase part" of the longitudinal component of the A.C. magnetic field detected with sensor 74 can be measured. That "in-phase part" of the longitudinal component of the A.C. magnetic field is defined as that part of the A.C. magnetic field which is in-phase with the A.C. current conducted through formation from power amplifier 22. For example, supposed that the A.C. current conducted into the formation from power amplifier 22 has a time dependence described mathematically in time as cos(wt), where "cos" is the cosine function, w is the angular frequency, and t is the time. Then the part of the longitudinal component of the A.C. magnetic field detected with sensor 74 which also has the time dependence of cos(wt) is defined as the "in-phase part" of the longitudinal component of the A.C. magnetic field. Similarly, the part of the longitudinal component of the A.C. magnetic field detected with sensor 74 which instead has the time dependence of sin(wt) is defined as the "out-of-phase part" of the longitudinal component of the A.C. magnetic field, where "sin" is the sine function.

Therefore, in FIG. 9, the phrases "in-phase part" and "out-of-phase part" are defined in relation to the phase of the A.C. current conducted into formation. In general, the "in-phase part" is defined herein as that part of the measured longitudinal component of the A.C. magnetic field which is in-phase with the conducted A.C. current that is responsible for generating the measured A.C. magnetic field. In the case of FIG. 9, the A.C. current generating the longitudinal component of the A.C. magnetic field is that A.C. current caused to flow through the geological formation. In FIG. 1, the A.C. current generating the longitudinal component of the A.C. magnetic field to be measured is that A.C. current flowing through wire 26 alternatively to magnetic sources S1 or S2. Convenient methods of producing A.C. magnetic fields are in fact different methods of causing A.C. currents to flow in different "circuit pathways" which may, or may not, include A.C. current flow through geological formations as discussed above. Furthermore, conducting A.C. current through a particular "circuit pathway" provides a particular means to subject a cased well to a subterranean A.C. magnetic field. Again such means can include passing A.C. currents through any number of "circuit pathways" including all those individual "circuit pathways" described as Methods I-A (1) through I-A (24) and Methods I-B (1) through I-B (25) that have already been described in detail.

"In-phase parts" and "out-of-phase parts" of waveforms are used to interpret data measured with induction coils in open holes, and such information is used to interpret geophysical information related to the surrounding geological formations in those uncased wells. By analogy therefore, several preferred embodiments of this invention teach measuring the "in-phase parts" and the "out-of-phase parts" of the longitudinal components of A.C. magnetic fields within cased wells to determine geophysical properties of the adjacent geological formations.

It should also be noted that there is an equivalent mathematical way to describe the "in-phase parts" and the "out-of-phase parts" of the longitudinal components of the A.C. magnetic fields. Using standard vector analysis, these two components can be alternatively represented as an the corresponding "amplitude" and the corresponding "phase angle" of the measurements described as follows. Using standard vector analysis, the "in-phase part" and the "out-of-phase part" of a given measurement are represented as orthogonal components along the abscissa and the ordinate of an ordinary 2 dimensional graph which therefore defines a given point on that graph. Alternatively, and equivalently, this point on the graph can be represented by an "amplitude" (which is the square root of the sums of the squares of the "in-phase components" and the "out-of-phase components"), and an angle from the abscissa, which is defined as "the phase angle" herein. Therefore, several preferred embodiments of the invention provide for methods and apparatus for measuring "the amplitudes" and "the phase angles" of the longitudinal components of the A.C. magnetic fields measured within cased wells to determine geophysical properties of adjacent geological formations. At any given vertical position within a well using a chosen embodiment of the invention, "the amplitude" and "the phase angle" of the longitudinal component of the A.C. magnetic field is measured within the cased well in response to A.C. currents caused to flow in a chosen "circuit pathway" to determine geophysical properties of the adjacent geological formations.

And furthermore, the high precision A.C. magnetic gradiometer previously described was explicitly designed to work inside conductive and magnetic steel borehole casing. However, it will respond slightly better if it is not surrounded by borehole casing. Therefore, the high precision A.C. magnetic gradiometer may be used in other geophysical exploration work inside uncased holes. It is very useful for uncased holes because in the prior art, no practical devices have been constructed which measure A.C. magnetic fields to a sensitivity of $1 \times 10^{-10}$ gauss peak-to-peak at frequencies between 1 and 10 Hz with integration times of several seconds in the presence of much larger geomagnetic noise. In particular, current sources can be placed in one open borehole causing resulting A.C. magnetic fields which depend on the preferential A.C. current flow through relatively conductive formations and the precision A.C. magnetic gradiometer can be placed in another open borehole. Precision induction measurements can then be performed which yield properties of the relatively conductive formations.

While the above description contains many specificities, these should not be construed as limitations on the scope of the invention, but rather as exemplification of one preferred embodiment thereof. As had been briefly described, there are many possible variations. Accordingly, the scope of the invention should be determined not only by the embodiments illustrated, but by the appended claims and their legal equivalents.

I claim:

1. The method of measurement of geological formation properties penetrated by two conductive and magnetic steel borehole casings which comprises the steps of: conducting A.C. current from a first current carrying electrical contact engaged with the interior of a first cased borehole and located at a first depth within said first cased borehole to a second current carrying electrical contact engaged with the interior of a second cased borehole located at a second depth within said second cased borehole, said first and second casings being spaced apart in the geological formation, which causes flowing A.C. currents to selectively follow geological formations which are relatively less resistive than other adjacent geological formations in the vicinity of said first and second casings, and whereby said flowing A.C. currents give rise to primary A.C. magnetic fields which in turn produce longitudinal components which penetrate to the interior of the first and second borehole casings, and whereby said primary A.C. magnetic fields in addition cause the production of eddy currents in the geological formation and currents in the casings which in turn produce secondary A.C. magnetic fields which possess longitudinal components which also subsequently penetrate the walls of the casings to the interior of said first and second casings; simultaneously measuring the in-phase part and the out-of-phase part of the vectorially combined longitudinal components of both the primary and secondary A.C. magnetic fields on the interior of said second casing at a predetermined vertical position within said second casing, repetitively performing said measurements at different predetermined vertical positions within the second borehole casing, thereby providing a method of measuring characteristic parameters of the formation through said second borehole casing including the resistivity and changes in the resistivity of the geological formation, whereby the frequency of the A.C. current is chosen to be in the range from 0.001 Hz to 20 Hz to allow said longitudinal components of the A.C. magnetic field to penetrate the conductive and magnetic steel borehole casings and whereby the magnitude of the currents conducted between said current conducting electrodes have a magnitude of at least 100 milliamps peak-to-peak which provides a sufficient magnitude A.C. magnetic field for measurement inside said second casing, and determining from said in-phase part and out-of-phase part of the vectorially combined longitudinal components a formation property.

2. An apparatus for measurement of the properties of a geological formation penetrated by two conductive and magnetic steel borehole casings comprising: a means of generating and conducting A.C. current through a geological formation from a first current conducting electrode in electrical contact with the interior of a first cased borehole located at a first depth within said first cased well to a second current conducting electrode in electrical contact with the interior of a second cased borehole located at a second depth within said second cased well, said cased boreholes being spaced apart within the geological formation, whereby said A.C. currents selectively follow geological formations which are relatively less resistive than other adjacent geological formations which produce longitudinal magnetic field components which penetrate to the interior of the first and second borehole casings, and whereby said primary A.C. magnetic fields in addition cause the production of eddy currents in the geological formation and currents in the casings which in turn produce secondary A.C. magnetic fields which possess longitudinal components which also subsequently penetrate the walls of the casings to the interior of said first and second casings; one or more magnetic field measurement means simultaneously sensitive to the in-phase part and the out-of-phase part of the vectorially combined longitudinal components of the primary and secondary A.C. magnetic fields on the interior of said second cased well for repetitively measuring the in-phase parts and the out-of-phase parts of the vectorially combined longitudinal component of both the primary and secondary A.C. magnetic fields at many vertical positions within said second borehole casing thereby providing indication of the presence of relatively conductive formations in the vicinity of said second casing, said magnetic field measuring means providing an indication of characteristic parameters of the geological formation through said second borehole casing including the resistivity and changes in the resistivity of the geological formation; wherein the frequency of the source of the A.C. current is between 0.001 Hz to 20 Hz thereby allowing said longitudinal A.C. magnetic fields to penetrate the casings and whereby the magnitude of the A.C. current conducted between said current conducting electrodes exceeds 100 milliamps peak-to-peak.

3. The method of measurement of geological formation properties penetrated by two conductive and magnetic steel borehole casings which comprises the steps of: conducting A.C. current from a first current carrying electrical contact engaged with the interior of a first cased borehole and located at a first depth within said first cased borehole to a second current carrying electrical contact engaged with the interior of a second cased borehole located at a second depth within said second cased borehole, said first and second casings being spaced apart in the geological formation, which causes flowing A.C. currents to selectively follow geological formations which are relatively less resistive than other adjacent geological formations in the vicinity of said first and second casings, and whereby said flowing A.C. currents give rise to primary A.C. magnetic fields which in turn produce longitudinal components which penetrate to the interior of the first and second borehole casings, and whereby said primary A.C. magnetic fields in addition cause the production of eddy currents in the geological formation and currents in the casings which in turn produce secondary A.C. magnetic fields which possess longitudinal components which also subsequently penetrate the walls of the casings to the interior of said first and second casings; simultaneously measuring the amplitude and the phase angle of the vectorially combined longitudinal components of both the primary and secondary A.C. magnetic fields on the interior of said second casing at a predetermined vertical position within said second casing, repetitively performing said measurements at different predetermined vertical positions within the second borehole casing, thereby providing a method of measuring characteristic parameters of the formation through said second borehole casing including the resistivity and changes in the resistivity of the geological formation, whereby the frequency of the A.C. current is chosen to be in the range from 0.001 Hz to 20 Hz to allow said longitudinal components of the A.C. magnetic fields to penetrate the conductive and magnetic steel borehole casings and whereby the magnitude of the currents conducted between said current conducting electrodes have a magnitude of at least 100 milliamps peak-to-peak which provides a sufficient magnitude A.C. magnetic field for measurement inside said second casing, and determining from said measurements of the amplitude and phase angle of said vectorially combined longitudinal components a formation property.

4. An apparatus for measurement of the properties of a geological formation penetrated by two conductive and magnetic steel borehole casings comprising: a means of generating and conducting A.C. current through a geological formation from a first current conducting electrode in electrical contact with the interior of a first cased borehole located at a first depth within said first cased well to a second current conducting electrode in electrical contact with the interior of a second cased borehole located at a second depth within said second cased well, said cased boreholes being spaced apart within the geological formation, whereby said A.C. currents selectively follow geological formations which are relatively less resistive than other adjacent geological formations which produce longitudinal magnetic field components which penetrate to the interior of the first and second borehole casings, and whereby said primary A.C. magnetic fields in addition cause the production of eddy currents in the geological formation and currents in the casings which in turn produce secondary A.C. magnetic fields which possess longitudinal components which also subsequently penetrate the walls of the casings to the interior of said first and second casings; one or more magnetic field measurement means sensitive to the amplitude and phase angle of the vectorially combined longitudinal components of the A.C. magnetic fields on the interior of said second cased well for repetitively measuring the vectorially combined longitudinal components of both the primary and secondary A.C. magnetic fields at many vertical positions within said second borehole casing thereby providing indication of the presence of relatively conductive formations in the vicinity of said second casing, said magnetic field measuring means providing an indication of characteristic parameters of the geological formation through said second borehole casing including the resistivity and changes in the resistivity of the geological formation; wherein the frequency of the source of the A.C. current is between 0.001 Hz to 20 Hz thereby allowing said longitudinal A.C. magnetic fields to penetrate the casings and whereby the magnitude of the A.C. current conducted between said current conducting electrodes exceeds 100 milliamps peak-to-peak.

5. The method of measurement of geological formation properties penetrated by at least a first conductive and magnetic steel borehole casing which comprises the steps of: generating and conducting A.C. current through a circuit pathway in the vicinity of the first borehole casing thereby subjecting both the casing and the geological formations to an applied A.C. magnetic field; and measuring the in-phase part and out-of-phase part of the longitudinal component of the total resulting A.C. magnetic field at a first depth within said first casing to measure geological formation properties; wherein the frequency of the A.C. current is in the range of 0.001 Hz to 20 Hz to allow a portion of the A.C. magnetic field present to penetrate said casing; and wherein the magnitude of the A.C. current conducted in said circuit pathway exceeds 100 milliamps peak-to-peak.

6. The method defined in claim 5 wherein said circuit pathway is an insulated copper wire horizontally disposed on the surface of the earth in the vicinity said first casing.

7. The method defined in claim 5 wherein said circuit pathway is a coil of insulated copper wire forming a solenoid that is vertically disposed at second depth from the surface of the earth within said first casing, wherein said first and second depths are separated by a vertical distance.

8. The method as defined in claim 5 wherein said circuit pathway is provided by conducting A.C. current from a first point on said first casing, through the intervening geological formations, to a second point on a second cased well, said second cased well being horizontally spaced apart from said first casing.

9. The method as defined in claim 5 wherein said circuit pathway is provided by conducting A.C. current between a second point on a second cased well to a third point on a third cased well; whereby said first casing, said second cased well, and said third cased well are all horizontally spaced apart within the geological formation.

10. The apparatus for measurement of geological formation properties in a geological formation penetrated by a first conductive and magnetic steel borehole casing comprising: means for generating and applying a primary excitation A.C. magnetic field to said first casing and to said geological formation; and means to simultaneously measure the in-phase part and out-of-phase part of the resulting total longitudinal magnetic field present at a first depth within said first casing; wherein the frequency of the source of the exciting A.C. magnetic field is between 0.001 Hz to 20 Hz.

11. The apparatus defined in claim 10 wherein said means for generating and applying the primary excitation A.C. magnetic field is located on the surface of the earth in the vicinity of said first casing.

12. The apparatus as defined in claim 10 wherein said means for generating and applying the primary excitation A.C. magnetic field is located at a second depth within said first casing.

13. The apparatus as defined in claim 10 wherein said means for generating and applying the primary excitation A.C. magnetic field is located at a third depth within a second cased well that is horizontally spaced apart from said first casing.

14. The apparatus as defined in claim 10 wherein said means for generating and applying the primary excitation A.C. magnetic field is located at a fourth depth within an uncased well that is horizontally spaced apart from said first casing.

15. The method of measurement of geological formation properties in an oil field penetrated by at least three horizontally spaced apart conductive and magnetic steel borehole casings which comprises the steps of: conducting A.C. current from a first current carrying electrical contact engaged with the interior of a first cased borehole and located at a first depth within said first cased borehole to a second current carrying electrical contact engaged with the interior of a second cased borehole located at a second depth within said second cased borehole, said first and second casings being horizontally spaced apart in the geological formation, which causes flowing A.C. currents to selectively follow geological formations which are relatively less resistive than other adjacent geological formations in the vicinity of said first and second casings, and whereby said flowing A.C. currents give rise to primary A.C. magnetic fields which in turn produce longitudinal components which penetrate to the interior of the third borehole casing, said third casing being horizontally spaced apart from said first and second casing, and whereby said primary A.C. magnetic fields in addition cause the production of eddy currents in the geological formation and currents in the casings which in turn produce secondary A.C. magnetic fields which possess longitudinal components which also subsequently penetrate the walls of the casings to the interior of said third borheole casing; measuring the longitudinal components of both the primary and secondary A.C. magnetic fields on the interior of said third casing at a predetermined vertical position within said third casing, repetitively performing said measurements at different predetermined vertical positions within the third borehole casing, thereby providing a method of measuring characteristic parameters of the formation through said third borehole casing including the resistivity and changes in the resistivity of the geological formation, whereby the frequency of the A.C. current is chosen to be in the range from 0.001 Hz to 20 Hz to allow said longitudinal components of the A.C. magnetic field to penetrate the third conductive and magnetic steel borehole casing and whereby the magnitude of the currents conducted between said current conducting electrodes have a magnitude of at least 100 milliamps peak-to-peak which provides a sufficient magnitude A.C. magnetic field for measurement inside said third casing, and determining from said longitudinal components a formation property.

16. An apparatus for measurement of the properties of a geological formation penetrated by at least three horizontally spaced apart conductive and magnetic steel borehole casings in an oil field comprising: a means of generating and conducting A.C. current through a geological formation from a first current conducting electrode in electrical contact with the interior of a first cased borehole located at a first depth within said first cased well to a second current conducting electrode in electrical contact with the interior of a second cased borehole located at a second depth within said second cased well, said first and second cased boreholes being spaced apart within the geological formation, whereby said A.C. currents selectively follow geological formations which are relatively less resistive than other adjacent geological formations which produce longitudinal magnetic field components which penetrate to the interior of the third borehole casing, and whereby said primary A.C. magnetic fields in addition cause the production of eddy currents in the geological formation and currents in the casings which in turn produce secondary A.C. magnetic fields which possess longitudinal components which also subsequently penetrate the walls of the casings to the interior of said third casing: one or more magnetic field measurement means sensitive to the longitudinal components of the A.C. magnetic fields on the interior of said third cased well for repetitively measuring the longitudinal components of both the primary and secondary A.C. magnetic fields at many vertical positions within said third borehole casing thereby providing indication of the presence of relatively conductive formations in the vicinity of said first, second, and third casings, said magnetic field measuring means providing an indication of characteristic parameters of the geological formation through said third borehole casing including the resistivity and changes in the resistivity of the geological formation; wherein the frequency of the source of the A.C. current is between 0.001 Hz to 20 Hz thereby allowing said longitudinal A.C. magnetic fields to penetrate the third casing and whereby the magnitude of the A.C. current conducted between said current conducting electrodes exceeds 100 milliamps peak-to-peak.

* * * * *